United States Patent
Lee et al.

(10) Patent No.: US 6,756,448 B2
(45) Date of Patent: Jun. 29, 2004

(54) STYRENE COPOLYMER

(75) Inventors: Kwanyoung Lee, Daejeon (KR); Namsun Choi, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 10/439,544

(22) Filed: May 15, 2003

(65) Prior Publication Data

US 2004/0059075 A1 Mar. 25, 2004

(30) Foreign Application Priority Data

Sep. 19, 2002 (KR) .................................. 10-2002-0057290

(51) Int. Cl.$^7$ ........................ C08F 295/00; C08F 212/08
(52) U.S. Cl. ........................ 525/245; 525/247; 525/271; 525/274; 525/288; 525/314; 526/173
(58) Field of Search ................................. 525/271, 288, 525/274, 247, 245, 314, 173

(56) References Cited

U.S. PATENT DOCUMENTS

| | | | |
|---|---|---|---|
| 3,842,059 A | * 10/1974 | Milkovich et al. ........... | 525/271 |
| 4,273,896 A | * 6/1981 | Martin ........................ | 525/271 |
| 5,247,020 A | 9/1993 | Nakano et al. | |
| 5,250,629 A | 10/1993 | Tani et al. | |
| 5,260,394 A | 11/1993 | Tazaki et al. | |
| 5,362,814 A | 11/1994 | Machida et al. | |
| 5,475,061 A | 12/1995 | Machida et al. | |
| 5,554,695 A | 9/1996 | Machida et al. | |
| 6,025,447 A | 2/2000 | Wünsch et al. | |
| 6,271,313 B1 | 8/2001 | Zambelli et al. | |

FOREIGN PATENT DOCUMENTS

| | | |
|---|---|---|
| EP | 1 077 224 A1 | 2/2001 |
| EP | 1 118 639 A2 | 7/2001 |

OTHER PUBLICATIONS

Arnold, Manfred, et al.; "Anionic copolymerization of butadiene and styryl–terminated polystyrene macromonomers"; Polymer Bulletin, Accepted Apr. 14, 1990; pp. 1–7; vol. 24.

Endo, Kiyoshi, et al.; "Syndiospecific copolymerization of styrene with styrene terminated isoprene macromonomer by CpTiCl3–methylaluminoxane catalyst"; MacroMol Rapid Commun.; 1998; pp. 563–566; vol. 19, No. 11.

"Crystalline Syndiotactic Polystyrene"; Macromolecules; 1986; pp. 2464–2465; vol. 19.

* cited by examiner

*Primary Examiner*—Fred Teskin
(74) *Attorney, Agent, or Firm*—Squire, Sanders & Dempsey L.L.P.

(57) ABSTRACT

The present invention relates to a styrene copolymer and the method of preparing the same through the steps described in the following:

- a step of making a living polymer with an active anion by polymerizing an anionically polymerizable monomer in a non polar solvent in the presence of alkyllithum catalyst;
- a step of preparing a macro monomer by reacting the abovementioned living polymer with a terminal modifier represented by the structure of formula 1; and
- a step of copolymerizing the above macro monomer with styrene monomer with transition catalyst and co-catalyst.

25 Claims, No Drawings

STYRENE COPOLYMER

PRIORITY REFERENCE TO PRIOR APPLICATION

This application claims benefit under 35 U.S.C. §119 of Korean patent application number 10-2002-0057290, entitled "Styrene Copolyiner," filed on Sep. 19, 2002, by inventors Kwanyoung Lee and Namsun Choi.

BACKGROUND OF THE INVENTION

1. Field of the Invention

The present invention relates to a styrene copolymer with syndiotactic regularity, more particularly, to a graft copolymer of a syndiotactic polystyrene prepared from styrene and a macromonomer, and a method for the preparation thereof.

2. Description of the Related Art

Polystyrene is generally prepared by radical polymerization in a tactic stereo regularity and has a good processability for extrusion or injection molding and other excellent physical properties, making it widely utilizable for industrial and household applications. However it, as a thermoplastic material, has shortcomings of weakness in heat resistance, impact resistance and chemical resistance.

The syndiotactic polystyrene prepared by metallocene catalyst is a crystalline polymer with high degree of stereo regularity and has enhanced heat resistance and chemical resistance as well as excellent electrical property. (Macromolecules, 1986, 19, 2464).

But it still has the same shortcomings in impact property as atactic polystyrene. For variety of application, improvement in the properties such as impact resistance and compatibility with other polymer materials is required.

Several remedies have been introduced in order to improve impact resistance or impart elasticity to the syndiotactic polystyrene. U.S. Pat. No. 5,247,020, presents the method of blending syndiotactic polystyrene with elastomer during the polymerization process. The method suggests syndiotactic polymerization of styrene in the presence of elastomers such as styrene-butadiene block copolymer, or styrene-isoprene block copolymer.

Also, in order to solve the problem, presented are the methods of random or block copolymerization with other monomers. In U.S. Pat. No. 5,475,061 and U.S. Pat. No. 5,554,695, syndiotactic copolymerization with acryl monomer is presented. U.S. Pat. No. 5,260,394 describes random copolymer of syndiotactic polystyrene obtained by copolymerization with olefins such as ethylene and propylene or conjugated dienes such as butadiene and isoprene. The syndiotactic copolymers obtained by these methods have low glass transition temperatures, exhibiting enhanced processability and elasticity. U.S. Pat. No. 6,271,313 presents the syndiotactic polystyrene block copolymer prepared from styrene and butadiene monomer. But the activity of catalyst of the polymerization decreased in the presence of butadiene and both of low yield and low content of polybutadiene was resulted.

Another alternative method to enhance the impact resistance of the syndiotactic polystyrene, described copolymers obtained from graft polymerization. In U.S. Pat. No. 5,250,629, polyacrylate grafted copolymer is presented, which is prepared by anionic initiation of a syndiotactic copolymer obtained from styrene and p-methylstyrene and subsequent polymerization. Styrene is polymerized in the presence of divinylbenzene and unreacted double bond of divinlybenzene unit in the resulted polymer is used for copolymerization with ethylene to make graft copolymer.

U.S. Pat. No. 5,362,814 introduces a method including copolymerization of diolefins such as vinylnorbornene and divinylbenzene with alpha olefins. The resulted copolymer has unreacted double bond which can be used for copolymerization with styrene. The obtained graft copolymer can be added as compatibilizing agent to a mixture of syndiotactic polystyrene and ethylene-propylene copolymer to give better mixing efficiency U.S. Pat. No. 6,025,447, presents the graft copolymer which is prepared by copolymerization of styrene and a copolymer of diene and styrene with styrenyl group attached to main chain. However, the modification of the copolymer of styrene and butadiene to introduce styrenyl group requires multiple chemical steps such as hydrofomylation of vinyl group of polydiene moiety and subsequent coupling reaction with vinylaomatic unit.

In EU Pat. 1,077,224, copolymers obtained from a macromonomer of polybutadiene or polyisoprene and styrene or its derivatives are suggested. The macromonomer was prepared by anionic polymerization of styrene, butadiene, isoprene or vinypyridine and terminal modification of living polymer anion. In EU Pat. 1,118,639, the polymer compositions made of this copolymer was shown to have an enhanced impact resistance. These prior arts using macromonomers require complex chemical steps in the preparation of macromonomer. The preparation methods generally need low temperature to prevent the formation of the by-products, (Macromol. Rapid commun. 1998, 19, 563) or requires excessive usage of terminal modifier, (Polymer Bulletin 1990, 24, 1) giving problems in separation and purification of the macromonomer.

SUMMARY OF THE INVENTION

The present invention provides a styrene copolymer in which polymeric chains capable to implement elasticity and impact resistance are attached to syndiotactic polystyrene and the preparation method thereof.

Styrene copolymer of the present invention is prepared by the steps of:

a. preparing living polymer with anion activity by polymerizing anionically polymerizable monomer in the presence of alkyllithium catalyst in a non polar solvent;

b. making macromonomer by reacting terminal modifier having a structure represented by the formula 1 with the above living polymer; and c. copolymerizing the abovementioned macromonomer and styrene monomer in the presence of transition metal catalyst and co-catalyst.

[Formula 1]

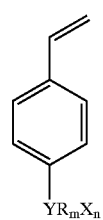

$YR_mX_n$ wherein, Y is Si or Sn atom, R is individually same or different $C_{1-20}$ alkyl group or aryl group, X is independently same or different Cl or Br, m is an integer and m+n=3.

Another object of the present invention is to provide a grafted copolymer of syndiotactic polystyrene prepared by copolymerization of styrene and macromonomer which is prepared at the ambient temperature with minimized formation of side product and the preparation method thereof.

DESCRIPTION OF THE PREFERRED EMBODIMENTS

The styrene copolymer of the present invention is accomplished by the steps of:

a. preparing living polymer with anion activity by polymerizing anionically polymerizable monomer in the presence of alkyllithium catalyst in a non polar solvent;
b. making macromonomer by reacting terminal modifier with a structure represented by the formula 1 with the living polymer; and
c. preparing styrene copolymer by copolymerizing the macromonomer and styrene monomer under transition metal catalyst and co-catalyst.

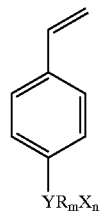

[Formula 1]

wherein, Y is Si or Sn atom, R is independently same or different $C_{1-20}$ alkyl group or aryl group, X is independently same or different Cl or Br, m is an integer and m+n=3.

The styrene copolymer of the present invention is a graft copolymer containing syndiotactic polystyrene and prepared by copolymerization of styrene and a macromonomer prepared by reacting p-chlorodimethylsilylstyrene with a living polymer with anionic activity. The copolymer is composed of the repeated unit of styrene monomer and the repeated unit of macromonomer wherein the unit of styrene monomer is of syndiotactic structure. The styrene copolymer has 1~50 weight %, of macromonomer content, the molecular weight of 20,000~1,000,000 and the melting point is 150–270° C.

The preparation method of styrene copolymer of the invention comprises:

a. preparing living polymer with anion activity by polymerizing anionically polymerizable monomer in the presence of alkyllithium catalyst in a non polar solvent;
b. making macromonomer by reacting terminal modifier having a structure represented by the formula 1 with the above living polymer; and
c. copolymerizing the said macromonomer and styrene monomer in the presence of transition metal catalyst and the co-catalyst.

The living polymer of anionic activity is prepared by adding alkyllithium initiator to anionically polymerizable monomer in inert hydrocarbon solvent. The inert hydrocarbon solvent for polymerization is selected from non-polar solvents generally known for anionic polymerization. Preferred inactive hydrocarbon solvents are cyclic aliphatic hydrocarbon solvent such as cyclohexane or cyclopentane, linear aliphatic hydrocarbon such as n-hexane, n-heptane, aromatic hydrocarbon solvents such as benzene, toluene and xylene, and their mixtures. Further preferred are cyclohexane, a mixture of cyclohexane and n-hexane and the mixture of cyclohexane and n-heptane The alkyllithium initiator is selected from the usual anion polymerization initiators.

Preferably, butyllithium isomers such as n-butyllithium, sec-butyllithium or tert-butyllithium are used. The temperature range used for the polymerization for the living polymer is –10~150° C., preferably 10~100° C. Constant or adiabatic temperature conditions may be used.

Anionically polymerizable monomer of the present invention includes vinyl aromatic monomers such as styrene and p-methylstyrene, acryl monomers such as methyl acrylate, ethyl acrylate and methyl methacrylate, and conjugated dienes such as 1,3-butadiene and isoprene. Preferably one or more monomers are selected from the group consisting of styrene, 1,3-butadiene and isoprene. When one anionically polymerizable monomer is used, the resulted polymer is homo polymer and two or more anionically polymerizable monomers are selected, block copolymer or random copolymer is made. In order to prepare block copolymer, the anionically polymerizable monomers are added in sequence, completing the polymerization of monomer at each step. The living polymers prepared as a block copolymer of the present invention include [polystyrene]-[polybutadiene anion], [polybutadiene]-[polystyrene anion], [polyisoprene]-[polystyrene anion], [polystyrene]-[polyisoprene anion].

The molecular weight of the living polymer with anionic activity is 500–200,000 for homopolymer, 500–200,000 for random copolymer and 500–200,000 for block copolymer. The content of butadiene or isoprene in the living polymer is 10~90 weight %.

The macromonomer of the present invention has an appropriate functional group to be used in the copolymerization with styrene and is prepared from the reaction of the living polymer with anionic activity and a terminal modifier with appropriate functional group in addition to the functionality to react with living anionic polymer. The terminal modifier in the present invention to react with living anionic polymer to form macromonomer is represented in the chemical formula 1.

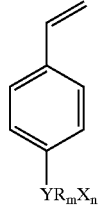

[Formula 1]

wherein Y is Si or Sn atom, R is independently same or different $C_{1-20}$ alkyl group or aryl group, X is independently same or different Cl or Br atom, m and n are integer where m+n=3.

Preferable terminal modifiers are p-chlorodimethylsilylstyrene, p-dichloromethylsilylstyrene and p-trichlorosilylstyrene. The abovementioned terminal modifiers have halogenated silyl group which has a high reactivity toward the living polymer anion and provide the styrene moiety at the terminal of the macromonomer. The reactions of terminal modifier with living polymers are carried out by adding terminal modifiers to the reaction system where the living polymers are prepared. Since polymerization of anionically polymerizable monomer is usually an exothermic reaction, the reaction with terminal modifiers takes place at the temperature above room temperature. The reaction temperature of the living polymer and the terminal modifiers to make macromonomers is in the range of 0° C.~100° C., more preferably in the range of 30° C.~95° C.

Since the halogenated silyl group attached to the terminal modifier of the present invention has high reactivity toward the living polymer anion, the reaction is completed in short period of time at room temperature or even faster at the polymerization temperature of the living polymer with minimized side reactions. The high reactivity also removes the excessive usage of terminal modifier and provides the quantitative formation of macromonomer. When there are two or more halogen atoms bonded to silyl group of the terminal modifier, the macromonomer having multiple living polymer chains attached are synthesized, having an advantage of increased contents of the macromonomer in the final copolymer of styrene and macromonomer.

For copolymerization of styrene monomer and macromonomer, the transition metal catalyst is used and represented by a structure in Formula 2.

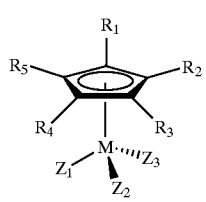

[Formula 2]

wherein M is group IV transition metals such as titanium, zirconium and hafnium, R1 to R5 are individually same or different alkyl with $C_{1-20}$, aryl, or hydrogen, $Z_1$–$Z_3$ are individually same or different halogen, alkyl with $C_{1-20}$, aryl, alkoxide, aryloxide and amide. The preferable transition metal catalysts are cyclopentadienylti-tanium trichloride ($CpTiCl_3$), cyclopentadienyltitanium trimethoxide ($CpTi(OMe)_3$), indenyltitanium trichloride ($IndTiCl_3$), pentamethylcyclopentadienylt-rimethyltitanium ($Cp^*TiMe_3$, where $Cp^*=Me_5Cp$).

The co-catalyst, organoaluminum compounds are represented by a structure of the following formula 3

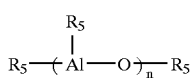

[Formula 3]

wherein $R_5$ is $C_{1-4}$ alkyl, preferably, methyl or ethyl, n is integers 3–40, preferably 10–25.

In the syndiotactic polymerization of styrene and macromonomer using the abovementioned catalysts, the mole ratio of group IV metallocene compound to styrene derivatives is $10^{-5}$~$10^{-1}$, and that of organoaluminum compound to group IV metallocene compound is 1~100,000, more preferably, 10~10,000.

The catalyst of group IV metallocene compound and the co-catalyst of organoaluminum compound may be added separately. Alternatively, the group IV metallocene compound and organoaluminum compound are mixed in a solvent prior to addition.

Solvent used in the copolymerization reaction of styrene monomer and macromonomer is an aromatic hydrocarbon or a saturated aliphatic hydrocarbon, which are inert to the polymerization reaction. Preferred solvent is alkyl benzenes such as benzene, toluene, xylene or mesitylene, alkanes like hexane, octane, and isooctane, and cycloalkanes such as cyclohexane.

The reaction temperature of copolymerization of styrene monomer and macromonomer is 10~200° C., preferably 25~100° C. The copolymerization reaction may be carried out under an atmosphere of inert gas such as nitrogen or argon.

In the following examples, the present invention is described in more details. These examples are intended for the illustration of the present invention and should not be construed as limiting the scope of the present invention.

EXAMPLE 1

All the chemicals used were distilled and kept under argon atmosphere. The atmosphere in a 2L reactor was replaced by argon gas. Into the reactor, added were 300 g of cyclohexane and 30 g (0.55 mol) of butadiene and the temperature was maintained at 40° C. The initiator, 7.63 mL (9.9 mmol) of sec-butyllithium (BuLi), in cyclohexane solution (1.3M) was added and the reaction was continued for 2 hours before the addition of 2.15 g (10.9 mmol) of p-chlorodimethylsilylstryene, which was dissolved in 5 mL cyclohexane. The reaction with the terminal modifier was run for 1 hour. The reaction was terminated by adding a few drops of degassed methanol. The product, macromonomer was filtered, washed several times with methanol, and the solvent was evaporated to obtain viscous oil. The synthesized polybutadiene macromonomer was stored in a freezer in dry-box filled with argon gas. The structure of polybutadiene macromonomer was determined by 1H-NMR.

1H-NMR ($\delta$, in $CDCl_3$, ppm): 0.258 (6H, m, $SiMe_2$), 0.857 (9H, m, sec-butyl), 2.042 (br, $CH_2$ in polybutadiene), 4.95 (m, vinyl in polybutadiene), 5.395 (br, CH=CH in polybutadiene), 5.3, 5.8 (2H, d, CH=$CH_2$ in styrene), 6.7 (1H, dd, CH=CH2 in styrene), 7.405 (4H, m, phenyl).

The molecular weight was determined by GPC.

GPC (g/mol): for polybutadiene Mn=780 Mw=850 Mw/Mn=1.09, and for polybutadiene macromonomer Mn=920 Mw=1,000 Mw/Mn=1.09 (monomodal distribution).

EXAMPLE 2

The atmosphere in a 2L reactor was replaced by argon gas. Into the reactor, added were 300 g of cyclohexane and 30 g (0.44 mol) of isoprene and the temperature was maintained at 40° C. The initiator, 4.62 mL (6 mmol) of sec-butyllithium (BuLi) in cyclohexane solution (1.3M conc.) was added and the reaction was run for 3 hours before the addition of 1.78 g (9 mmol) of p-chlorodimethylsilylstryene, the terminal modifier, which was dissolved in 5 mL cyclohexane. The reaction with the terminal modifier was run for 2 hours. The reaction was terminated by adding a few drops of degassed methanol. The product, macromoner was filtered, washed several times with methanol, and the solvent was evaporated to obtain viscous oil. The synthesized polyisoprene macromonomer was stored in the dry-box freezer filled with argon gas. The structure of polyisoprene macromonomer was determined by 1H-NMR.

1H-NMR ($\delta$, in $CDCl_3$, ppm): 0.295 (6H, m, $SiMe_2$), 0.861 (9H, m, sec-butyl), 1.677, 2.033 (br, $CH_2$, $CH_3$ in polyisoprene), 4.718 (d, vinyl in polyisoprene), 5.125 (br, CH=CH in polyisoprene), 5.3, 5.8 (2H, m CH=$CH_2$ in styrene), 6.7 (1H, m CH=$CH_2$ in styrene), 7.4 (4H, m, phenyl).

The molecular weight was obtained by GPC.

GPC (g/ml): for polyisoprene Mn=6,100 Mw=6.400 Mw/Mn=1.04, and for polyisoprene macromonomer Mn=6.300 Mw=6,600 Mw/Mn=1.04 (monomodal distribution).

EXAMPLE 3

All the chemicals used were distilled and kept under argon atmosphere. The atmosphere in a 2L reactor was replaced by argon gas. Into the reactor, added were 200 g of distilled cyclohexane and 10 g (96 mmol) of styrene and the temperature was maintained at 45° C. The initiator, 4 mL (5.2 mmol) of sec-butyllithium (BuLi) in cyclohexane solution (1.3M conc.) was added and the reaction was continued for 40 minutes. 40 g (0.74 mol) of butadiene was added and the reaction was run for 1 hour before the addition of 1.1 g (6 mmol) of p-chlorodimethylsilylstryene, the terminal modifier, which was dissolved in 5 mL cyclohexane. The reaction with the terminal modifier was run for 1 hour. The reaction was terminated by adding a few drops of degassed methanol. The product, macromonomer was filtered, washed several times with methanol, and the solvent was evaporated to obtain viscous oil. The synthesized polystyrene-block-polybutadiene macromonomer was stored in the dry-box freezer filled with argon gas. The structure of polystyrene-block-polybutadiene was determined by 1H-NMR.

1H-NMR ($\delta$, in $CDCl_3$, ppm): 0.248 (6H, m, Si $Me_2$), 0.65 (9H, m, sec-butyl), 1.425 (br, $CH_2$ in polystyrene), 2,607 (br, CH in polystyrene, $CH_2$ in polybutadiene), 4.99 (m vinyl in polybutadiene), 5.383 (br, CH=CH in polybutadiene), 5.3, 5.7 (2H, d, $CH=CH_2$ in styrene), 6.6, 7.078 (br, $C6H_5$ in polystyrene), 7.4 (4H, m, $C_6H_4$ in styrene).

The molecular weight was obtained by GPC.

GPC (g/ml): for polystyrene, Mn=2,330 Mw=2,550 Mw/Mn=1.09, for polystyrene-block-polybutadiene, Mn=12,000 Mw=12,400 Mw/Mn=1.03, and for polystyrene-block-polybutadiene macromonomer Mn=12,200 Mw=12,500 Mw/Mn=1.02 (monomodal distribution).

EXAMPLE 4

All the chemicals used were distilled and kept under argon atmosphere. The atmosphere in a 2L reactor was replaced by argon. Into the reactor, added were 250 g of distilled cyclohexane and 50 g (0.48 mmol) of styrene and the temperature was maintained at 40° C. The initiator, 13 mL (16.9 mmol) of sec-butyllithium (BuLi) in cyclohexane solution (1.3M conc.) was added and the reaction was run for 50 minutes before the addition of 3.6 g (18.3 mmol) of p-chlorodimethylsilylstryene, which was dissolved in 5 mL cyclohexane. The reaction with the terminal modifier was run for 1 hour. The reaction was terminated by adding a few drops of degassed methanol. The product, macromonomer was filtered, washed several times with methanol, and the solvent was evaporated to obtain white solid. The synthesized atactic polystyrene macromonomer was stored in the dry-box freezer filled with argon gas. The structure of atactic polystyrene macromonomer was determined by 1H-NMR.

1H-NMR ($\delta$, in $CDCl_3$, ppm): 0.145 (6H, m, $SiMe_2$), 0.845 (9H, m, sec-butyl), 1.565 (br, $CH_2$ in polystyrene), 2.013 (br, CH in polystyrene), 5.3, 5,8 (2H, m, $CH=CH_2$), 6.7, 7.2 (5H, br, phenyl).

The molecular weight was obtained by GPC.

GPC (g/ml): for polystyrene Mn=3,600 Mw=3,800 Mw/Mn=1.05, and for polystyrene macromonomer Mn=3,870 Mw=4,050 Mw/Mn=1.05 (monomodal distribution).

EXAMPLE 5

Into a 100 mL Schlenk flask in a dry box, 0.6 g of polybutadiene macromonomer synthesized in the Example 1 was added and connected to an argon gas line. In 30 mL of distilled toluene, macromonomer was dissolved and heated to 70° C. for polymerization. 4.5 g (43.2 mmol) of styrene and 3.3 mL (8 mmol) of MAO (methylaluminoxane) were added and stirred the mixture for 5 minutes. 2.2 mg (8 $\mu$mol) of indenyltitaniumtrichloride ($IndTiCl_3$) dissolved in toluene was added to start polymerization. As soon as the catalyst was added the reaction solution turned to greenish brown. The polymerization was continued for 1 hour. To terminate the reaction, 10% HCl methanol solution containing small amount of antioxidant was added. The produced polymer of white powder was filtered and washed fully with excess methanol. It was dried under vacuum at 70° C. It was extracted with methylethylketone using Soxhlet extractor for 6 hours and dried to obtain syndiotactic polystyrene polybutadiene copolymer.

EXAMPLE 6

Following the same procedure as in Example 5, copolymerization of styrene and polybutadiene macromonomer was performed except using 1.0 g of polybutadiene macromonomer.

EXAMPLE 7

Following the same procedure as in Example 5, copolymerization of styrene and polybutadiene macromonomer was performed except using 0.87 g of polybutadiene macromonomer.

EXAMPLE 8

Following the same procedure as in Example 5, copolymerization of styrene and polybutadiene macromonomer was performed except using 0.43 g of polybutadiene macromonomer and the metal catalyst, pentamethylcyclopentadienyltrimethyltitanium ($Cp^*TiMe_3$) instead of indenyltitaniumtrichloride ($IndTiCl_3$).

EXAMPLE 9

Following the same procedure as in Example 8, copolymerization of styrene and polybutadiene macromonomer was performed except using 1.3 g of polybutadiene macromonomer.

EXAMPLE 10

Following the same procedure as in Example 8, copolymerization of styrene and polybutadiene macromonomer was performed except using 0.4 g of polybutadiene macromonomer.

EXAMPLE 11

Following the same procedure as in Example 8, copolymerization of styrene and polybutadiene macromonomer was performed except using 0.78 g of polybutadiene macromonomer.

EXAMPLE 12

Following the same procedure as in Example 8, copolymerization of styrene and polybutadiene macromonomer was performed except using 1.85 g of polybutadiene macromonomer.

EXAMPLE 13

Following the same procedure as in Example 8, copolymerization of styrene and polybutadiene macromonomer was performed except using 3 g of polybutadiene macromonomer and 22.5 g of styrene.

EXAMPLE 14

In a dry box, into a 100 mL Schlenk flask, 0.5 g of polyisoprene macromonomer synthesized in the Example 2 was added and connected to an argon gas line. Except using 30 mL of distilled toluene, macromonomer was dissolved and heated to 70° C. for polymerization. 4.5 g (43.2 mmol) of styrene and 3.3 mL (8 mmol) of MAO (methylaluminoxane) were added and stirred the mixture for 5 minutes. 2.2 mg (8 μmol) of indenyltitaniumtrichloride (IndTiCl$_3$) dissolved in toluene was added to start polymerization. As soon as the catalyst was added the reaction solution turned to greenish brown. The polymerization was continued for 1 hour. To terminate the reaction, 10% HCl methanol solution containing small amount of antioxidant was added. The produced polymer of white powder was filtered and washed fully with excess methanol. It was dried under vacuum at 70° C. It was extracted with methylethylketone except using soxhlet extractor for 6 hours and dried to obtain syndiotactic polystyrene polyisoprene copolymer.

EXAMPLE 15

Following the same procedure as in Example 14, copolymerization of styrene and polyisoprene macromonomer was performed except using 1.5 g of polyisoprene macromonomer.

EXAMPLE 16

Following the same procedure as in Example 14, copolymerization of styrene and polyisoprene macromonomer was performed except using 1.25 g of polyisoprene macromonomer.

EXAMPLE 17

Following the same procedure as in Example 14, copolymerization of styrene and polyisoprene macromonomer was performed except using 0.9 g of polyisoprene macromonomer.

EXAMPLE 18

Following the same procedure as in Example 14, copolymerization of styrene and polyisoprene macromonomer was performed except using 0.5 g of polyisoprene macromonmer and the metal catalyst, pentamethylcyclopentadienyltrimethyltitanium (Cp*TiMe$_3$) instead of indenyltitaniumtrichloride (IndTiCl$_3$).

EXAMPLE 19

A 1L glass reactor equipped with a stirred and oil bath was connected to an argon line and the atmosphere of the reactor was replaced with argon gas. Freshly distilled toluene 100 mL was added into the 1L flask. In dry box, into a separate 100 mL Schlenk flask, 5 g of polystyrene-block-polybutadiene macromonomer synthesized in the Example 3, was added and connected to the argon gas line. Using 30 mL of toluene, the macromonomer was dissolved and this solution was added to the above glass reactor. The glass reactor was heated to 70° C. for polymerization. 22.5 g (216 mmol) of styrene and 16.5 mL (40 mmol) of MAO (methylaluminoxane) were added and stirred the mixture for 5 minutes. 9.2 mg (40 μmol) of pentamethylcyclopentadienytrimethyltitanium (Cp*TiMe$_3$) dissolved in toluene was added to start polymerization. As soon as the catalyst was added the reaction solution turned to greenish brown. The reaction was continued at 70° C. for 2 hours and a viscous mixture with several white precipitates was obtained. To terminate the reaction, 10% HCl methanol solution was added. The produced polymer was stirred with excess methanol containing antioxidant. The produced polymer of white powder was filtered and washed fully with methanol. It was dried under vacuum at 70° C. It was extracted with methylethylketone using Soxhlet extractor for 6 hours and dried to obtain copolymer of syndiotactic polystyrene and polystyrene-block-polybutadiene.

EXAMPLE 20

Following the same procedure as in Example 19, copolymerization of styrene and polystyrene-block-polybutadiene macromonomer was performed except using 24.75 mL (60 mmol) of MAO.

EXAMPLE 21

In dry box, into a 100 mL Schlenk flask, 1.5 g of polystyrene-block-polybutadiene macromonomer synthesized in the Example 3 was added and connected to the argon gas line. Using 30 mL of toluene, macromonomer was dissolved and heated to 70° C. for polymerization. 4.5 g (43.2 mmol) of styrene and 3.3 mL (8 mmol) of MAO (methylaluminoxane) were added and stirred the mixture for 5 minutes. 1.83 mg (8 μmol) of pentamethylcyclopentdienyltrimethyltitanium (Cp*TiMe$_3$) dissolved in toluene was added to start polymerization. As soon as the catalyst was added the reaction solution turned to greenish brown. The polymerization was continued for 1 hour. To terminate the reaction, 10% HCl methanol solution containing small amount of antioxidant was added. The produced polymer of white powder was filtered and washed with excess methanol. It was dried under vacuum at 70° C. It was extracted with methylethylketone using Soxhlet extractor for 6 hours and dried to obtain copolymer of syndiotactic polystyrene and polystyrene-block-polybutadiene.

EXAMPLE 22

Following the same procedure as in Example 21, copolymerization of styrene and polystyrene-block-polybutadiene macromonomer was performed except using 0.47 g of polystyrene-block-polybutadiene.

EXAMPLE 23

Following the same procedure as in Example 21, copolymerization of styrene and polystyrene-block-polybutadiene macromonomer was performed except using 1.8 g of polystyrene-block-polybutadiene.

EXAMPLE 24

In dry box, into a 100 mL Schlenk flask, 1 g of atactic polystyrene macromonomer synthesized in the Example 4 was added and connected to the argon gas line. Using 30 mL of toluene, macromonomer was dissolved and heated to 70° C. for polymerization. 4.5 g (43.2 mmol) of styrene and 3.3 mL (8 mmol) of MAO (methylaluminoxane) were added and stirred the mixture for 5 minutes. 1.83 mg (8 μmol) of pentamethylcyclopentdienyltrimethyltitanium (Cp*TiMe$_3$) dissolved in toluene was added to start polymerization. As soon as the catalyst was added the reaction solution turned to greenish brown. The polymerization was continued for 1 hour. To terminate the reaction, 10% HCl methanol solution containing small amount of antioxidant was added. The produced polymer of white powder was filtered and washed fully with excess methanol. It was dried under vacuum at 70° C. It was extracted with methylethylketone using soxhlet extractor for 6 hours and dried to obtain syndiotactic polystyrene and atactic polystyrene copolymer.

EXAMPLE 25

Following the same procedure as in Example 24, copolymerization of styrene and atactic polystyrene macromonomer was performed except that the catalytic system pentamentylcyclopentadienyltrimethytitanium (Cp*TiMe3) and MAO were mixed and aged for 5 minutes prior to addition.

EXAMPLE 26

Following the same procedure as in Example 25, copolymerization of styrene and atactic polystyrene macromonomer was performed except using 2 g of atactic polystyrene macromonomer.

<Determination of Melting Point>

Heat properties such as glass transition temperature and melting temperature were determined by Metzsch DSC200 cell unit and TASC414/3 controller with the heating rate of 15° C./min. All the test samples were heated to 300° C. and cooled down slowly in advance to measurement for the uniform thermal history.

<Determination of Molecular Weight>

The molecular weight of syndiotactic polystyrene copolymer was determined by gel permeation chromatography (GPC) using Waters Alliance 2000GPCV model at 140° C. The eluent solvent was 1,2,4-trichlorobenzene containing Irganox 1010 (1 g Irganox1010 in 4L of solvent) and passed through a series of 3 columns of Waters Styragel HT 2, Styragel HT 3 and Styragel HT 4 with a flow rate of 0.92/min.

The molecular weight analysis of macromonomer was run by separation's module Waters 2690 and differential refractometer Waters 410 were used. The conditions of analysis were as following. Column temperature is 41° C., Solvent was tetrahydrofuran (THF) and flow rate is 1.0 mL/min. The columns used were sequentially connected Styragel HR 5E, Styragel HR 4, Styragel HR 2 and determined by RI detector on the basis of polystyrene standard sample.

<Content Analysis of Macromonomer>

The content of styrene, butadiene and isoprene in macromonomer was determined by NMR analysis using Bruker NMR-200 and NMR-400 nuclear magnetic resonance spectrometer. The test samples were prepared in chloroform-d solvent. The content of styrene, butadiene, isoprene and macromonomer in the styrene copolymer was analyzed using Bruker NMR-200 or NMR-400 nuclear magnetic resonance spectrometer. The test samples were prepared by 1,2,4-trichlorbenzene-d3 at 120° C.

The molecular weight and melting points of the syndiotactic polystyrene copolymers obtained from the abovementioned polymerizations are listed in Table 1,2,3,4.

TABLE 1

| | Macromonomer | Content of butadiene (wt. %) | Number average molecular weight(Mn) | Weight Average molecular weight(Mw) | Molecular Weight Distribution (Mw/Mn) | Melting Point (° C.) |
|---|---|---|---|---|---|---|
| Example 5 | Example 1 | 4 | 18,600 | 31,700 | 1.71 | 260 |
| Example 6 | Example 1 | 6 | 13,000 | 20,900 | 1.61 | 249 |
| Example 7 | Example 1 | 2 | 13,500 | 26,200 | 1.95 | 256 |
| Example 8 | Example 1 | 4 | 59,000 | 95,900 | 1.63 | 266 |
| Example 9 | Example 1 | 10 | 57,800 | 104,400 | 1.81 | 225 |
| Example 10 | Example 1 | 4 | 64,100 | 118,600 | 1.85 | 258 |
| Example 11 | Example 1 | 4 | 40,600 | 72,200 | 1.78 | 248 |
| Example 12 | Example 1 | 12 | 60,200 | 92,100 | 1.53 | — |
| Example 13 | Example 1 | 3 | 33,600 | 62,500 | 1.86 | 249 |

TABLE 2

| | Macromonomer | Content of isoprene (wt. %) | Number average molecular weight(Mn) | Weight Average molecular weight(Mw) | Molecular Weight Distribution (Mw/Mn) | Melting Point (° C.) |
|---|---|---|---|---|---|---|
| Example 14 | Example 2 | 2 | 18,200 | 37,600 | 2.07 | 255 |
| Example 15 | Example 2 | 4 | 14,000 | 23,700 | 1.7 | 258 |
| Example 16 | Example 2 | 5 | 12,800 | 22,200 | 1.71 | 256 |
| Example 17 | Example 2 | 5 | 13,000 | 22,500 | 1.73 | 255 |
| Example 18 | Example 2 | 2 | 36,400 | 73,200 | 2.01 | 268 |

TABLE 3

| | Macromonomer | Content of butadiene (wt. %) | Number average molecular weight(Mn) | Weight Average molecular weight(Mw) | Molecular Weight Distribution (Mw/Mn) | Melting Point (° C.) |
|---|---|---|---|---|---|---|
| Example 19 | Example 3 | 4 | 32,600 | 61,000 | 1.87 | 264 |
| Example 20 | Example 3 | 6 | 39,100 | 68,100 | 1.74 | 270 |
| Example 21 | Example 3 | 19 | 24,300 | 54,400 | 2.24 | 272 |
| Example 22 | Example 3 | 5 | 44,900 | 94,900 | 2.11 | 268 |
| Example 23 | Example 3 | 7 | 43,400 | 93,100 | 2.14 | 269 |

TABLE 4

| | Macro-monomer | Content of atactic styrene (wt. %) | Number average molecular weight(Mn) | Weight Average molecular weight(Mw) | Molecular Weight Distribution (Mw/Mn) | Melting Point (° C.) |
|---|---|---|---|---|---|---|
| Example 24 | Example 4 | 12 | 60,900 | 106,400 | 1.75 | 257 |
| Example 25 | Example 4 | 14 | 45,800 | 81,800 | 1.79 | 260 |
| Example 26 | Example 4 | 19 | 108,300 | 162,100 | 1.5 | 262 |

According to the result of the abovementioned examples, the method of the present invention is an efficient method of synthesizing syndiotactic polystyrene copolymer.

Effect of the Invention

As illustrated above, using the method of the present invention, macromonomer was efficiently obtained by the use of the terminal modifier, represented by the formula 1, with good reactivity and selectivity. Syndiotactic polystyrene graft copolymer in which conjugated diene system is effectively incorporated was obtained by syndiotactic copolymerization of macromonomer and styrene in the presence of metallocene catalyst system.

What is claimed is:

1. Styrene copolymer prepared by the steps of:
   a. preparing living polymer with anionic activity by polymerizing anionically polymerizable monomer in the presence of alkyllithium catalyst in a non polar solvent;
   b. making macromonomer by reacting terminal modifier having a structure represented by the formula 1 with the above living polymer with anionic acitivity; and
   c. copolymerizing the abovementioned macromonomer and styrene monomer in the presence of transition metal catalyst and a co-catalyst

[Formula 1]

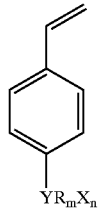

wherein, Y is Si or Sn atom, R is individually same or different $C_{1-20}$ alkyl group or aryl group, X is independently same or different Cl or Br, m is an integer and m+n=3.

2. The styrene copolymer of claim 1 wherein styrene copolymer is comprised of repeated unit of styrene monomer and the repeated unit of macromonomer and the repeated unit of styrene monomer has syndiotactic structure.

3. The styrene copolymer of claim 1 wherein the anionically polymerizable monomer is at least one monomer selected from the group consisting of styrene, 1,3-butadiene and isoprene.

4. The styrene copolymer of claim 1 wherein the living polymer is homo polymer having the molecular weight in the range of 500 to 200,000.

5. The styrene copolymer of claim 1 wherein the living polymer is a random copolymer having the molecular weight in the range of 500 to 200,000.

6. The styrene copolymer of claim 1 wherein the living polymer is a block copolymer having the molecular weight in the range of 500 to 200,000.

7. The styrene copolymer of claim 6 wherein the block copolymer is selected from the group consisting of [polystyrene]-[polybutadiene], [polystyrene]-[polyisoprene], [polybutadiene]-[polystyrene] and [polyisoprene]-[polystyrene].

8. The styrene copolymer of claim 7 wherein the content of the said styrene in block copolymer is in range of 10 to 90 weight %.

9. The styrene copolymer of claim 1 wherein the alkyllithium catalyst is more than one compound selected from the group consisting of n-butyllithium, sec-butyllithiuni and tert-butyllithium.

10. The styrene copolymer of claim 1 wherein the non polar solvent is more than one solvent selected from the group consisting of benzene, toluene, xylene, hexane, heptane and cyclohexane.

11. The styrene copolymer of claim 1 wherein the terminal modifier is selected from the group consisting of p-chlorodiniethylsilylstyrene, p-dichloromethylsilylstyrene and p-trichioromethylsilylstyrene.

12. The styrene copolymer of claim 1 wherein the styrene monomer is selected from the group consisting of styrene, o-, m-, p-methylstyrene, o-, m-, p-ethylstyrene, o-, m-, p-propylstyrene and o-, m-, p-tert-butylstyrene.

13. The styrene copolymer of claim 1 wherein the transition metal catalyst has a structure represented by the formula 2

[Formula 2]

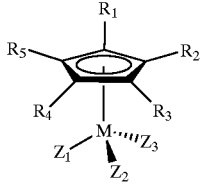

wherein M is titanium, zirconium or hafnium, $R_1$ to $R_5$ are independently same or different alkyl with $C_{1-20}$, aryl, or hydrogen, $Z_1$–$Z_3$ are independently same or different halogen, alkyl with $C_{1-20}$, aryl, alkoxide, aryloxide and amide.

14. The styrene copolymer of claim 1 wherein the co-catalyst has a structure represented by the formula 3

[Formula 3]

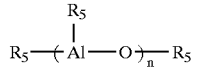

wherein $R_5$ is $C_{1-4}$ alkyl, n is an integer 3–40.

15. A method for preparation of styrene copolymer comprising the steps of:
   a. preparing living polymer with anionic activity by polymerizing anionically polymerizable monomer in the presence of alkyllithium catalyst in a non polar solvent;

b. making macromonomer by reacting terminal modifier having a structure represented by the formula 1 with the above living polymer with anionic activity; and c. copolymerizing the said macromonomer and styrene monomer in the presence of transition metal catalyst and a co-catalyst

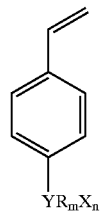

[Formula 1]

wherein, Y is Si or Sn atom, R is independently same or different C1–20 alkyl group or aryl group, X is independently same or different Cl or Br, m is an integer and m+n=3.

16. The method for preparation of styrene copolymer of claim 15 wherein the living polymer with anionic activity is a homopolymer, a random copolymer or a block copolymer.

17. The method for preparation of styrene copolymer of claim 15 or 16 wherein the molecular weight of living polymer with anionic activity is in the range of 500 to 200,000.

18. The method for preparation of styrene copolymer of claim 16 wherein the living polymer with anionic activity is prepared in one of the forms consisting of [polystyrene]-[polybutadiene anion], [polystyrene]-[polyisoprene anion], [polybutadiene]-[polystyrene anion] and [polyisoprene]-[polystyrene anion].

19. The method for preparation of styrene copolymer of claim 15 wherein the anionically polymerizable monomer is more than one compound selected from the group consisting of styrene, 1,3-butadiene and isoprene.

20. The method for preparation of styrene copolymer of claim 15 wherein the said alkyllithium is more than one compound selected from the group consisting of n-butyllithium, sec-butyllithium and tert-butyllithium.

21. The method for preparation of styrene copolymer of claim 15 wherein more than one solvent are selected from the group consisting of benzene, toluene, xylene, hexane, heptane and cyclohexane.

22. The method for preparation of styrene copolymer of claim 15 wherein the styrene monomer is selected from the group consisting of styrene, o-, m-, p-methyistyrene, o-, m-, p-ethylstyrene, o-, m-, p-propylstyrene and o-, m-, p-tert-butylstyrene.

23. The method for preparation of styrene copolymer of claim 15 wherein the reaction temperature of the said living polymer and the terminal modifier is in the range of 30 to 95 C.

24. The method for preparation of styrene copolymer of claim 15 wherein the transition metal catalyst has a structure represented by the formula 2

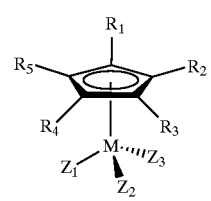

[Formula 2]

wherein M is titanium, zirconium or hafhium, $R_1$ to $R_5$ are independently same or different alkyl with $C_{1-20}$, aryl, or hydrogen, Z1–Z3 are independently same or different halogen, alkyl with $C_{1-20}$, aryl, alkoxide, aryloxide and ainide.

25. The method for preparation of styrene copolymer of claim 15 wherein the said co-catalyst has a structure represented by the formula 3

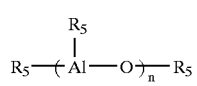

[Formula 3]

wherein $R_5$ is $C_{1-4}$ alkyl, n is an integer 3 to 40.

* * * * *